US005488525A

United States Patent [19]
Adams et al.

[11] Patent Number: 5,488,525
[45] Date of Patent: Jan. 30, 1996

[54] DECOUPLED MAGNETIC HEAD ASSEMBLY FOR QUARTER-INCH TAPE

[75] Inventors: George F. Adams; Vincent N. Kahwaty, both of Tucson, Ariz.

[73] Assignee: International Business Machines Corporation, Armonk, N.Y.

[21] Appl. No.: 292,680

[22] Filed: Aug. 18, 1994

[51] Int. Cl.$^6$ .............................. G11B 5/265; G11B 5/48
[52] U.S. Cl. ...................... 360/104; 360/77.12; 360/121
[58] Field of Search .................................... 360/104, 121, 360/77.12, 122

[56] References Cited

U.S. PATENT DOCUMENTS

| | | | |
|---|---|---|---|
| 3,263,031 | 7/1966 | Welsh | 179/100.2 |
| 3,821,804 | 6/1974 | Stevenson et al. | 360/77 |
| 4,007,493 | 2/1977 | Behr et al. | 360/77 |
| 4,149,198 | 4/1979 | Behr et al. | 360/77 |
| 4,152,736 | 5/1979 | Jansen et al. | 360/78 |
| 4,558,380 | 12/1985 | Porter | 360/53 |
| 4,685,005 | 8/1987 | Fields, Jr. | 360/121 X |
| 4,729,048 | 3/1988 | Imakoshi et al. | 360/103 |
| 4,903,151 | 2/1990 | Mizukami et al. | 360/121 X |
| 5,027,245 | 6/1991 | Nagata et al. | 360/121 |
| 5,109,306 | 4/1992 | Mase et al. | 360/77.04 |
| 5,132,861 | 7/1992 | Behr et al. | 360/121 |
| 5,161,299 | 11/1992 | Denison et al. | 360/121 X |
| 5,229,895 | 7/1993 | Schwarz | 360/77.12 |

Primary Examiner—John H. Wolff
Attorney, Agent, or Firm—Baker, Maxham, Jester & Meador

[57] ABSTRACT

A magnetic head assembly is provided which has top and bottom zones for processing a magnetic tape alternately in opposite directions. Each zone contains a top write element and read element pair and a bottom write element and read element pair, the write element of each pair being located on a first gap line and the read element of each pair being located on a second gap line. Located between the read elements on the second gap line are a plurality of servo elements. The pitch of the servo elements is a multiple of the track pitch of the magnetic tape and the pitch of the write elements is a multiple of the pitch of the servo elements. The servo elements are totally dedicated to servoing on pre-recorded servo tracks on the magnetic tape. A servo element on the first gap line is on a common servo track with one of the servo elements on the second gap line so as to provide a pair of servos on the same servo track. During initialization of the tape drive, this pair of servo elements transmits signals to compensate for any track misregistration (TMR) due to head assembly inaccuracies during fabrication or tape skew. The bottom zone of the head assembly is a mirror image of the top zone. Each of the servo elements in the same gap line sequentially servo through all of the servo tracks so that the write elements in the same gap line can write a top and bottom sets of data tracks. When one servo element transition through all of the servo tracks, then the adjacent servo takes over and transitions through all of the servo tracks and so on until all of the sets of write tracks have been completed. This servoing and writing operation alternates between the top and bottom zones sequentially as the tape reverses its direction, one tape pitch at a time. When one of the zones is operational, one of its servos is a primary servo and the mirror image of this servo in the opposite zone serves as a back-up auxiliary servo for maintaining the write elements on track. When a scratch or tape defect is detected by the primary servo, control is transferred to the auxiliary servo to maintain the write elements on track.

28 Claims, 8 Drawing Sheets

DECOUPLED MAGNETIC HEAD ASSEMBLY FOR QUARTER-INCH TAPE

BACKGROUND OF THE INVENTION

1. Field of the Invention

The present invention relates to a magnetic head assembly for recording tape, such as quarter-inch tape, and more particularly to a multi-element magnetic head assembly in which the servo elements are decoupled from the read elements.

2. Description of the Related Art

Quarter-inch tape is especially useful for backing up data generated on a computer. Generally 10 to 13 gigabytes of data may be stored on a quarter-inch tape, the tape generally being contained within a quarter-inch cartridge referred to in the industry as QIC. A 10 gigabyte QIC would be known as a QIC-10. Because of the large amount of backup data that is stored by virtually any computer equipped office and even by users of home computers, it is desirable that as much backup data as possible be packed per unit area of the magnetic tape. There are three major techniques to maximize packing density, namely: (1) reduction of track widths, (2) increasing linear recording density and (3) optimization of the layout of data and servo tracks on the tapes.

As is known, a magnetic head assembly for a tape drive combines write and read elements in an integrated structure that provides the capability of writing and reading multiple tracks on a moving tape. The size of a write element determines how many bits of data can be written per square inch of tape. More particularly, the length of the gap of the write element limits linear density of information written by the head and the width of the gap determines the track density of information written by the head. The product of these two parameters is areal density. Areal density indicates the density with which information may be stored on the tape and is expressed in bits per square inch.

The layout of data and servo tracks on a tape is determined by the arrangement of the elements on a head surface of a head assembly. The head assembly typically contains multiple write, read and servo elements. The write elements have a magnetic record gap and the read and servo elements are magneto-sensitive transducers which have a magnetic read gap and a magnetic servo gap respectively. The write element gaps and read/servo transducers gaps form a part of the head surface which faces a magnetic tape. The gaps are normally aligned along one or more gap lines, each gap line lying in a respective plane that defines a head assembly module which may be joined to one or more other modules during fabrication. A three-module head assembly with a write gaps and a read gap are located on a common data lines. Additionally, first and second servo gaps are located in each gap line on a common servo line. This is typical for processing quarter-inch tape. Data is first written to a track in a forward direction. In the prior art the tape may then be reversed so that data is written to an adjacent track. The tape is reversed again to move in the forward direction to write to the next adjacent track, and so on. A significant problem with this mode of data recording is known as "double track squeeze". In this regard, a data track is effectively narrowed ("squeezed") by adjacent data tracks above and below it which are written in a direction that is opposite to the data track being squeezed. In each direction of travel, the tape has an inherent signature of lateral movement which does not match the signature in the opposite direction. The signatures of two outer tracks encroach upon the edges of a sandwiched track, narrowing the effective width of the sandwiched track. In order to eliminate double track squeeze, it is necessary to increase the track pitch, which then decreases the areal density of the quarter-inch tape.

A typical three-module head assembly may employ read elements for the dual purpose of reading and servoing. This makes the width of the gap of the read element dependent upon the width of the gap needed for servoing, which is typically larger than that required for reading. Increasing the width of the read element gap requires wider write element gaps because tracks are normally written wider than the gaps of read elements to provide a track misregistration margin. This is referred to as "write wide and read narrow". This dependency also increases the required pitch of the tracks and results again in less areal density. It would be highly desirable to decouple the reading and servoing functions from a single read element, and perform these functions separately with separate elements. With such a decoupling, the data track/servo track arrangement can be optimized to increase the areal density of the quarter-inch tape. Decoupling would also allow increased flexibility in the design of guard bands without affecting track pitch.

Other problems are associated with the prior art three-module head assembly. Each module is constructed separately with read elements in one module, write elements in a second module, and read elements in a third module. The modules are joined during fabrication to produce the integrated head assembly. Each module has a gap line for the alignment of magnetic elements. When the modules are joined together, it is difficult to align the elements on a common track with a tolerance of 3 μm or less. This results in track misregistration (TMR) which is especially apparent between gap lines. This problem has been solved in the past by increasing track pitch. This, however, reduces the areal density of the tape. It would be desirable to provide an arrangement for compensating for TMR due to the inaccuracy of joining modules during fabrication. Further, it would be desirable if this same arrangement would compensate for tape skew, which is inherent in each magnetic tape drive and which produces the same effect as TMR. Further, it would be desirable if the head assembly could be made from two modules instead of three in order to reduce the cost of construction.

Another problem with prior art head assemblies has been the inability to stay on track when a servo element encounters longitudinal scratches or defects along a servo track. When this occurs, the track may be lost and a considerable amount of data may not be written. It is highly desirable to maintain tracking even when a servo element encounters a longitudinal scratch or defect along the servo track.

The prior art head assemblies also constrain the width of the write elements. Because of the close proximity of magnetic elements along a gap line, the width of the write elements must be limited, which in turn requires two or more layers of coils in the write element to generate sufficient flux to write reliably. Double deck coil configurations are expensive. It would be desirable if sufficient width could be provided for the write head so that a single layer of coils could be fabricated.

SUMMARY OF THE INVENTION

A magnetic head assembly is provided which has first and second zones for processing a magnetic tape alternately in opposite directions. The second zone of the head assembly is a mirror image of the first zone. Each zone contains a first write element and read element pair, the write element of each set, and a second write element and read element set being located on a first gap line and the read element of each set being located on a second gap line. Located between the read gaps on the second gap line are a plurality of servo elements. The pitch of the servo gaps is a multiple of the track pitch of the magnetic tape and the pitch of the write gap is a multiple of the pitch of the servo gaps. The servo elements are dedicated to servoing on pre-recorded servo tracks on the magnetic tape. A servo gap on the first gap line is on a common servo line with one of the servo gaps on the second gap line so as to provide a pair of servo gap on the same servo line. During initialization of the tape drive the servo for this pair of servo gaps transmits signals to compensate for any track misregistration (TMR) due to head assembly inaccuracies during fabrication or tape skew. Each of the servo elements in the same gap line with the read elements sequentially servos through all of the servo tracks so that the write elements in the respective zone can write first and second sets of data tracks. When a servo element transitions through all of the servo tracks, the adjacent servo element takes over and transitions through all of the servo tracks and so on until all of the sets of write tracks have been completed. For each track pitch, this servoing and writing operation alternates between the first and second zones each time the tape reverses its direction.

As an example, if the magnetic tape includes 12 servo tracks in each band, wherein each band corresponds to a zone and if three servo elements are provided in each zone with a pitch of the corresponding servo gaps equal to the width across the 12 servo tracks, then each of the write elements in the read/write pairs in the first zone writes a total of 36 tracks as the magnetic tape moves in all of its forward directions. When the magnetic tape moves in all of its reverse directions, each of the write elements of the read/write pairs in the second zone writes a total of 36 tracks. As the magnetic tape alternates between forward and reverse directions, the tape is alternately written by the first and second zones. Since all data tracks in each zone are written in the same direction, this eliminates the double track squeeze problem. Since the track width of the read gaps does not have to be as large as the track width of the servo gaps, the track width of the write gaps can be narrower to reduce track pitch and thereby increase the amount of backup data that can be written to the tape. The arrangement of the gaps in the present head assembly is referred to as "a decoupled magnetic head assembly", since the read elements no longer perform double duty of reading and servoing, instead all read elements are dedicated to reading and all servo elements are dedicated to servoing.

With the present invention a pair of servo gaps in opposite gap lines but along the same servo line can be provided in each of the first and second zones. With this arrangement TMR or tape skew can be detected by a pair of servo elements so as to implement a change in the azimuth of the head assembly. By having a pair of servo elements in each zone, if a servo element in one zone encounters a scratch or defect in the servo track, control can be switched to the servo element in the other zone so that it can take over the servoing function to keep the write elements on track. Because the read heads and servo heads are decoupled, more flexibility is provided for designing guard bands without affecting the track pitch. The pitch of the magnetic gaps along a gap line is also increased so that a single layered coil can be constructed in a head rather than a double layered coil. The preferred two module head assembly of the present invention is cheaper to construct than the three-module head assembly, and has less stroke across a magnetic tape so that more magnetic heads can be constructed on a single wafer.

An object of the present invention is to provide a decoupled magnetic head assembly which eliminates double track squeeze.

Another object is to provide an arrangement of magnetic elements on a head surface of a magnetic head assembly for writing an increased mount of data on a magnetic tape.

A further object is to provide a decoupled magnetic head assembly which has backup servoing between a pair of zones to overcome the problem of write failure due to scratches and/or defects on a magnetic tape.

Still another object is to provide a decoupled head assembly which has an arrangement of servo elements which will compensate for TMR and/or tape skew.

Still another object is to provide a decoupled magnetic head assembly which allows flexibility of design of guard bands without affecting track pitch.

Still another object is to provide a decoupled magnetic head assembly which will enable lower cost construction of the magnetic heads for the assembly.

Other objects and advantages will become apparent when considered in light of the following description of the invention.

DESCRIPTION OF THE PREFERRED EMBODIMENTS

Figure 1:
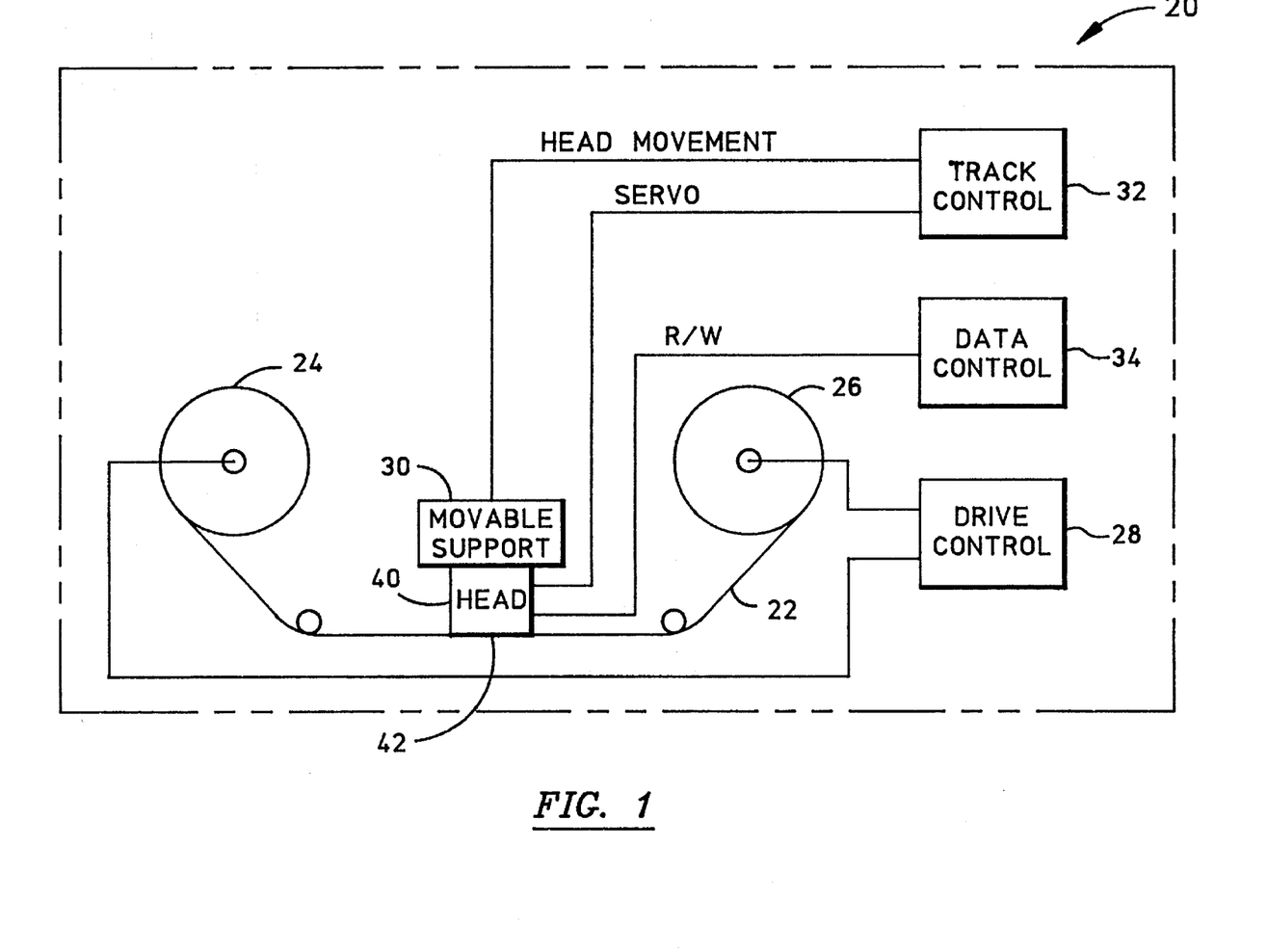
FIG. 1 is a schematic illustration of an exemplary magnetic tape drive employing the magnetic head assembly of the present invention.

Referring now to the drawings, wherein like reference numerals designate like or similar parts throughout the several views, there is illustrated in FIG. 1 a magnetic tape drive 20 which includes the magnetic head assembly 40 of the present invention. A magnetic tape 22, which may be a quarter-inch tape, is moved linearly past a head surface 42 of the head assembly 40 in either a forward or a reverse direction by a pair of reels 24 and 26. A drive control 28 is provided for rotating the reels 24 and 26 alternately in forward and reverse directions. The reels 24 and 26 may be open or one or more of the reels may be mounted in a cartridge. When a cartridge is employed the magnetic tape is usually pulled from the cartridge by a leader pin which interlocks with a leader block within the cartridge.

The head assembly 40 is supported in a transducing relationship with respect to the magnetic tape 22 by a movable support 30. The movable support 30 moves transverse to the magnetic tape 22 so that elements on the head surface 42 of the magnetic head assembly 40 can process the tape. As will be explained in more detail hereinafter, this processing involves servo elements which read servo tracks on the tape to sequentially position pairs of write elements and read elements for writing and reading a series of data tracks on the magnetic tape 22. Accordingly, the magnetic head assembly 40 feeds servo information to a track control 32 which processes this information and feeds head movement signals to the movable support 30. Further, the head assembly 40 is connected to a data control 34 which processes signals of the write and read elements of the magnetic head assembly 40.

Figure 2:
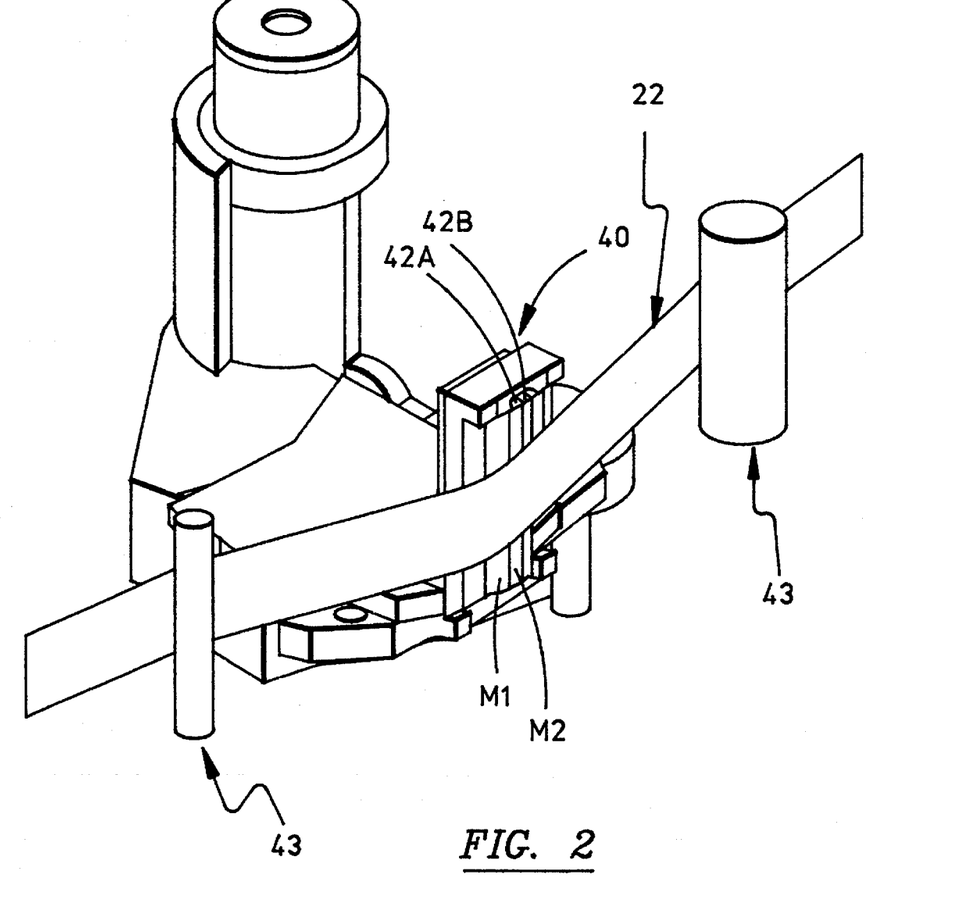
FIG. 2 is an elevational view showing the engagement of a magnetic tape by a multi-element magnetic head assembly with two modules.

FIG. 2 shows the magnetic head assembly 40 in greater detail. The head assembly 40 includes two multi-element modules, M1 and M2, as they engage a surface of the magnetic tape 22. The tape is retained by guides 43 against the head surfaces 42A and 42B on the modules M1 and M2, respectively.

Figure 3:
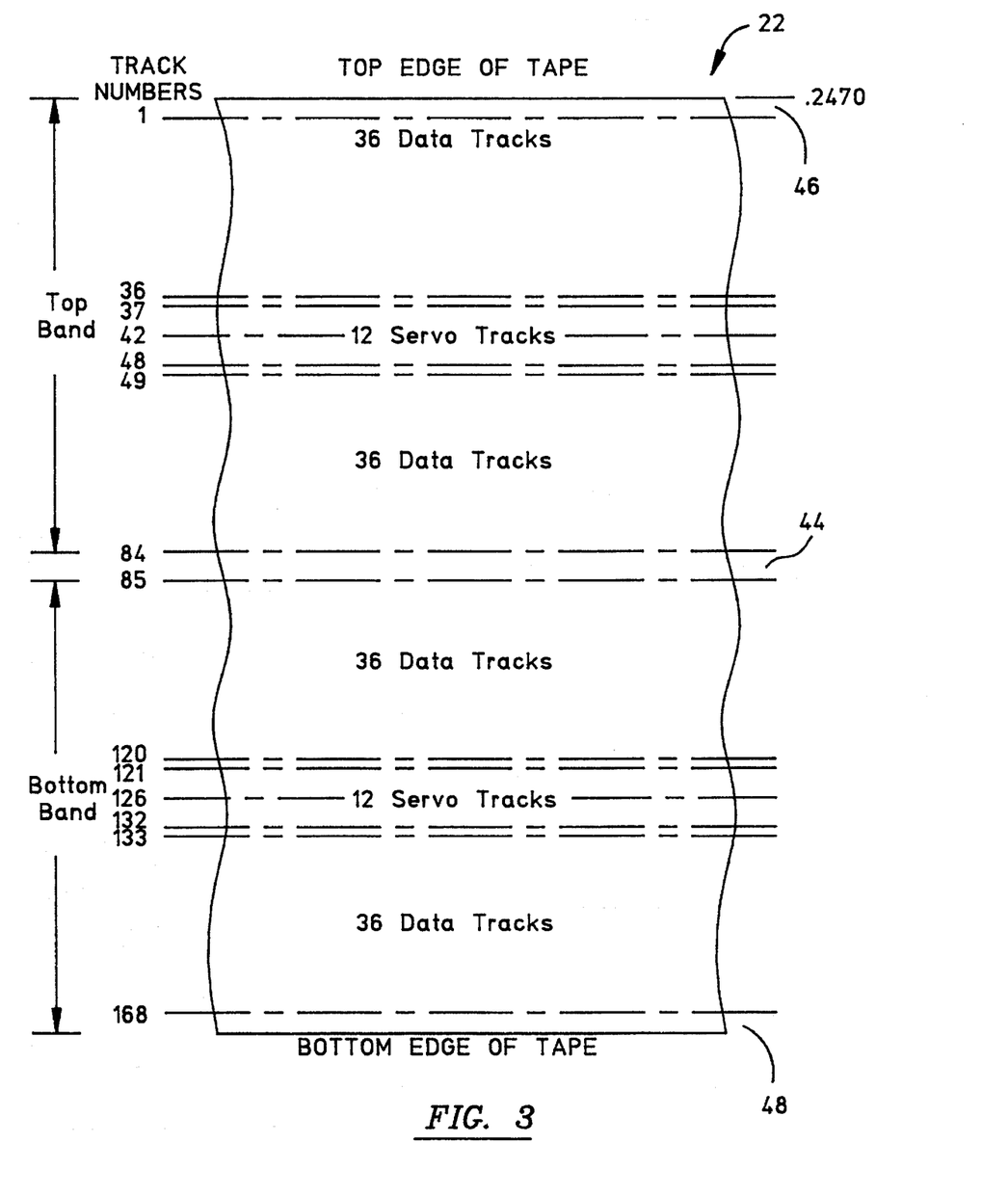
FIG. 3 is a schematic illustration of a width portion of a quarter-inch tape illustrating the arrangement of data tracks and servo tracks in first and second bands.

FIG. 3 illustrates an exemplary track layout across a quarter-inch magnetic tape 22, which has a dimension of 0.2470 inches. It is to be understood, however, that the track layout can apply to any width of tape. The layout is divided into a first (or "top") band and a second (or "bottom") band, the top band having top and bottom data tracks which are separated by a plurality of servo tracks and the bottom band having top and bottom data tracks which are separated by a plurality of servo tracks. The total number of tracks can be 168, which are numbered at the left side of FIG. 2. Each of the top and bottom data tracks of the top and bottom bands may contain 36 data tracks and each of the servo tracks in the top and bottom bands may contain 12 servo tracks. If the track pitch of all of these tracks is 34 µm, this will leave some of the tape for guard bands when a quarter-inch tape is employed. Accordingly, a middle guard band 44 may be provided between top and bottom guard bands 46 and 48. The middle guard band 44 may be 51 µm wide while the top and bottom guard bands 46 and 48 may be 250 µm wide.

In the present invention, the top band will be written as the tape moves in one direction and the bottom band will be written as the tape moves in the opposite direction. For the layout described hereinabove, the present invention provides three servo elements for each of the top and bottom bands so as to permit 36 data tracks to be written by top and bottom read/write element pairs which will be described in more detail hereinafter. It should be understood, however, that the number of servo tracks, data tracks, servo elements and read/write element pairs can vary according to the teachings of the present invention. The essence of the layout shown in FIG. 2 is that there are top and bottom bands with each of these bands containing top and bottom data tracks separated by servo tracks and that the top and bottom bands are written during opposite directions of travel of the tape. The employment of 36 data tracks in each of the upper and lower data tracks of each band and and 12 servo tracks in each band, as shown in FIG. 2, is a preferred embodiment for one quarter-inch magnetic tape since this arrangement optimizes the quantity of data which can be packed on this size of tape without sacrificing performance.

Figure 4:
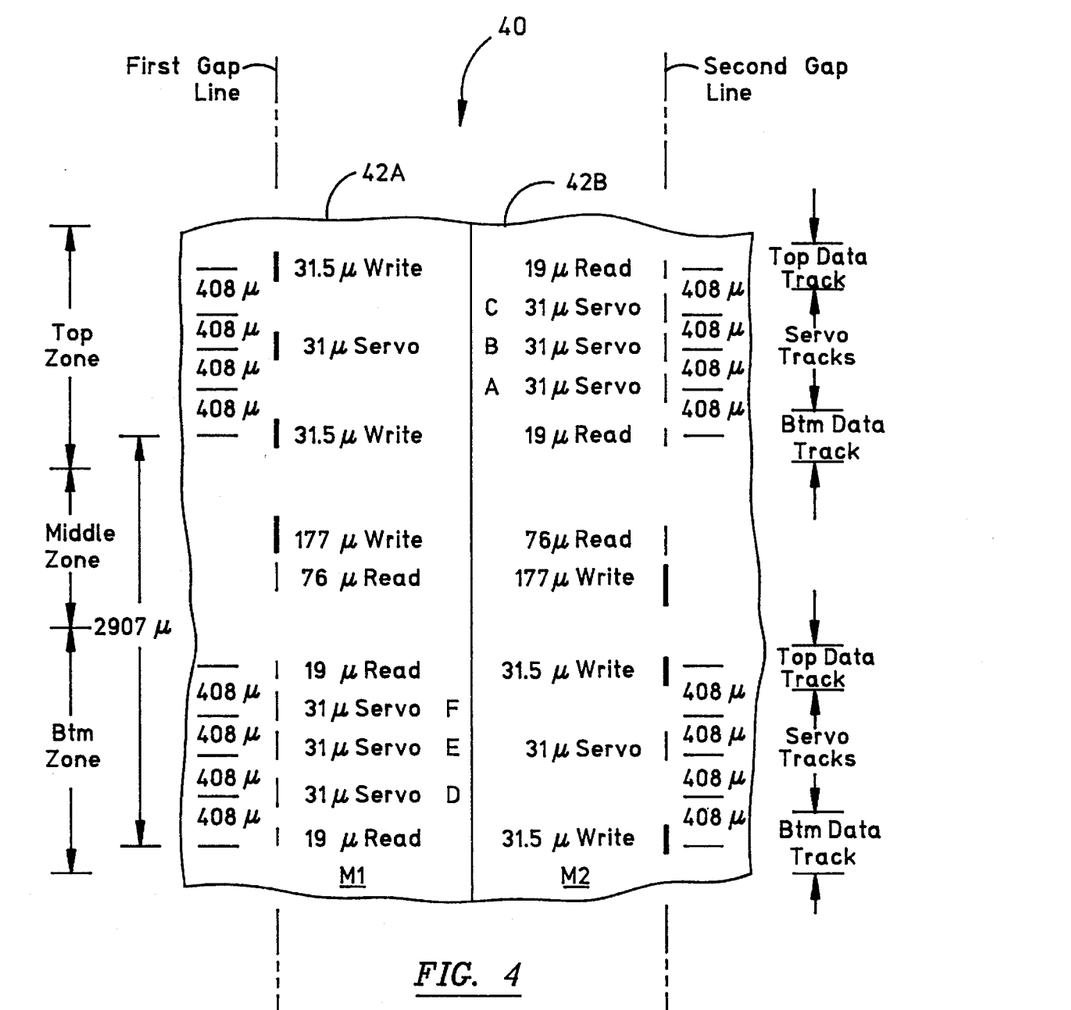
FIG. 4 is a schematic illustration of an arrangement of write gaps, read gaps and servo gaps on the head surface of one embodiment of the magnetic head assembly.

FIG. 4 shows a layout of gaps of magnetic heads at the head surface 42 of a preferred embodiment of the magnetic head assembly 40. FIG. 4 is a schematic representation of the surfaces 42A and 42B of the modules M1 and M2, respectively, showing the preferred layout of write, read, and servo gaps. The locations of the various magnetic gaps are shown by small vertical lines. Preferably, each write element comprises a transducing gap and each of the servo elements and each of the read elements comprises a magnetoresistive stripe which provides a reading gap. The head assembly 40 has first (or "top") and second (or "bottom") zones which may be separated by a middle zone. Each of the zones has a length, which extends along a length of the magnetic tape in a tape drive, and a width which extends from top to bottom. In the preferred embodiment, the layout of the elements in the top and bottom zones are a mirror image with respect to one another. Accordingly, the top zone will be described which will be a mirror image description of the bottom zone. The top zone includes top and bottom laterally spaced data lines which extend along a length of the top zone and first and second longitudinally spaced gap lines which extend laterally along a width of the top zone. A top pair of a write gap and a read gap are located in the top data track and a bottom pair of a write gap and a read gap are located in the bottom data track. A plurality of servo lines, preferably three servo lines, are located between the top and bottom data lines. At least one servo element is located in each of the servo lines, which will be described in more detail hereinafter. The first and second gap lines are perpendicular to the top and bottom data lines and the servo lines.

Each gap has a line width which is located across a respective track and which is aligned along a respective gap line. In a preferred embodiment of the invention, the track width of each servo gap is 31 µm, the track width of each read gap is 19 µm, and the track width of each write gap is 31.5 µm. These dimensions are optimized for a quarter-inch magnetic tape with a track pitch of 34 µm as illustrated in FIG. 3.

The servo gaps shown in FIG. 4 are dedicated to servoing on servo lines and the read gaps are dedicated to reading data lines. In the prior art a read element was employed for performing both servoing and reading functions. This limited the minimum size of the track pitch resulting in less data being packed on the magnetic tape. A servo line has to have a wide enough track width to ensure a good signal for servoing information. The track width of the prior art read gap did not have to be this wide but was locked into this width because the read gap was also required to perform servoing functions. The track width of the write gap then had to be wider than the read gap since this is a design requirement. Consequently, the track pitch of the magnetic tape had to be wide in order to accommodate these gaps. By dedicating the servo gaps to servoing on servo tracks, the track width of the read gap is now independent and can be made narrower to accommodate narrower tracks. It can be seen that when the track width of the read gap is 19 µm and the track width of the write gap is 31.5 µm that the "write wide read narrow" objective is well met. Further, the track width of the servo gap can be made close to the track width of the write gap so that a slightly wider track, such as 31 µm, optimizes the servo design and enables a maximum amount of data to be packed on the magnetic tape.

In the embodiment shown in FIG. 4, it is preferred that three servo gaps be aligned on the second gap line and a single servo gap be aligned on the first gap line. It is further preferred that the middle servo of the servos aligned on the second gap line be located on a common line with the servo aligned on the first gap line so as to provide a servo pair which extends along the top zone. The servo pair is especially useful for compensating for track misregistration (TMR) which is caused by inaccuracies during the construction of a head assembly and/or tape skew in the tape drive. When the head assembly is constructed, it is built in modules, one module being all of the magnetic gaps along the first gap line and the other module being all of the magnetic gaps along the second gap line. These modules are then joined together to form the head assembly. Unfortunately, the construction inherently offsets the magnetic gaps along the data tracks 3–4 μm which causes TMR. Tape skew is caused by inherent inaccuracies in the construction of the tape drive which causes the tape to encounter data tracks on the head surface at some slight angle which causes the same effect as TMR. These problems are overcome by employing the middle servo pair to take an initial reading of the middle servo track so as to determine the degree of TMR. If the servos of the servo pair do not read the same signal on the middle servo track, signals are fed to the track control 32 in FIG. 1. The track control then signals the movable support 30 to adjust the angle of the head assembly 40 to compensate for TMR. This angular adjustment is known as azimuth control which results in a rotation of the head assembly 40 until the middle servo pair is aligned on the middle servo line and the write/read element pairs are aligned on the data lines. It should be noted that this will result in a slight azimuthal error of the elements with respect to the tape, however, this is much less of a problem than TMR. After the middle servo pair has performed its initializing function, which is prior to any writing or reading of the tape, the servo gap which is located on the first gap line is dropped from service since it is no longer needed until initializing is again required.

It should be noted that in the top zone the top and bottom read gaps and all of the servo gaps are aligned along the second gap line and that the top and bottom write gaps are aligned along the first gap line. This is important since the servo gaps must be kept as far as possible from the write gap to prevent interference. When a servo element is servoing close to a write element, such as 400 μm away, the noise from the write element interferes with the servo function causing inaccuracies in the servo data. It should be remembered that the servo element on the first gap line operates only during initialization of the magnetic tape drive and is not performing while the top and bottom write elements are performing.

When the magnetic tape has a track pitch of 34 μm, as stated hereinabove, the pitch of the servo gaps in the second gap line can be 12 times the track pitch which equals 408 μm. It should be understood that this multiple could be something other than 12; however, the multiple 12 optimizes the amount of data which can be written on a quarter-inch tape as explained more fully hereinbelow. The pitch of the write gaps aligned along the first gap line is a multiple of the pitch of the servo gaps. When three servo gaps are employed on the second gap line the multiple is 4. The pitch of the write gaps on the first gap line is then 1632 μm (4×408 μm). It should be understood that any width desired for top and bottom guard bands would have to be added to the 1632 μm so that the pitch for the write gaps on the first gap line will be some multiple times the pitch of the servo gaps plus the allowance for one or more guard bands. With the arrangement of magnetic gaps described for the top zone of the head surface of the head assembly 40 each of the servo gaps in the second gap line can sequentially read each of the 12 servo tracks in the top band of the magnetic tape shown in FIG. 3. As will be explained in more detail hereinafter, the top and bottom write gaps on the first gap line will write the top and bottom 36 data tracks in the top band of FIG. 3 when a sequential servoing operation is implemented.

It should be understood that the servo gaps in the second gap line retrieve data which is embedded in the 12 servo tracks in the top band of the magnetic tape shown in FIG. 3. All of the data written by the write elements on the first gap line is written in the same direction of travel of the tape. The write gaps on the first gap line in the top zone will write only when the travel of the tape is to the right as shown in FIG. 4. During this operation, both write gaps on the first gap line write simultaneously and the corresponding read gaps on the second gap immediately read the written data to verify its results.

As stated hereinabove, the bottom zone of the head surface, shown in FIG. 4, is a mirror image of the top zone. Accordingly, all of the gaps described along the first gap line in the top zone are applicable for the second gap line in the bottom zone and all of the gaps described on the second gap line in the top zone are applicable for the first gap line of the bottom zone. In the preferred embodiment, the first and second gap lines of the top zone are coextensive with the first and second gap lines of the bottom zone. This will be accomplished during construction since all of the magnetic gaps on each gap line are built simultaneously in a respective head module. The magnetic gaps in the top zone of FIG. 4 operate only when the tape is traveling to the right and the magnetic gaps in the bottom zone operate only when the magnetic tape is traveling to the left. The middle servo pair shown in the bottom zone can compensate for TMR in the same way that the middle servo pair in the top zone compensates for TMR.

An important aspect of the invention is that the servo gaps in the second gap line of the top zone and the servo gaps in the first gap line of the bottom zone serve back-up functions for each other depending on which zone is operational. If the top zone is operational, namely when the magnetic tape is moving to the right and one of the servos elements, such as the top servo, is servoing, the top servo of the bottom zone will also be servoing as an auxiliary back up and will take control should the servo in the top zone fail to perform its function. A failure of servoing readily occurs when there are longitudinal scratches or defects in the track being servoed. Should this occur, the track control 32 of FIG. 1 detects this failure and switches servoing over to the top servo of the bottom zone so that the top and bottom write/read element pairs will be maintained on their data tracks. When the middle servo element on the second gap line of the top zone is servoing the middle servo on the first gap line of the bottom zone provides a back up. The same goes for the bottom servos in the second and first gap lines. When the tape reverses its direction of travel, then one of the servo elements on the first gap line in the bottom zone serves as a primary servo and the corresponding servo element on the second gap line in the top zone serves as an auxiliary back up servo in the same way described hereinabove. This back-up feature provides continuity of performance even though the magnetic tape may have scratches or be defective.

With the above description, the operation of the embodiment of the magnetic head assembly 40 in FIG. 4 can be explained for writing data tracks on the magnetic tape shown in FIG. 3. Accordingly, reference is made to FIGS. 3 and 4 and the chart entitled "Track Recording Sequence" hereinbelow.

TRACK RECORDING SEQUENCE

| Tape Track | Tape Dir | Head Pos | Main Servo No./Trk | Aux Servo No./Trk |
|---|---|---|---|---|
| 1&49 | → | 1 | A 37 | D 121 |
| 2&50 | → | 2 | A 38 | D 122 |
| 3&51 | → | 3 | A 39 | D 123 |
| 4&52 | → | 4 | A 40 | D 124 |
| 5&53 | → | 5 | A 41 | D 125 |
| 6&54 | → | 6 | A 42 | D 126 |
| 7&55 | → | 7 | A 43 | D 127 |
| 8&56 | → | 8 | A 44 | D 128 |
| 9&57 | → | 9 | A 45 | D 129 |
| 10&58 | → | 10 | A 46 | D 130 |
| 11&59 | → | 11 | A 47 | D 131 |
| 12&60 | → | 12 | A 48 | D 132 |
| 13&61 | → | 13 | B 37 | E 121 |
| 14&62 | → | 14 | B 38 | E 122 |
| 15&63 | → | 15 | B 39 | E 123 |
| 16&64 | → | 16 | B 40 | E 124 |
| 17&65 | → | 17 | B 41 | E 125 |
| 18&66 | → | 18 | B 42 | E 126 |
| 19&67 | → | 19 | B 43 | E 127 |
| 20&68 | → | 20 | B 44 | E 128 |
| 21&69 | → | 21 | B 45 | E 129 |
| 22&70 | → | 22 | B 46 | E 130 |
| 23&71 | → | 23 | B 47 | E 131 |
| 24&72 | → | 24 | B 48 | E 132 |
| 25&73 | → | 25 | C 37 | F 121 |
| 26&74 | → | 26 | C 38 | F 122 |
| 27&75 | → | 27 | C 39 | F 123 |
| 28&76 | → | 28 | C 40 | F 124 |
| 29&77 | → | 29 | C 41 | F 125 |
| 30&78 | → | 30 | C 42 | F 126 |
| 31&79 | → | 31 | C 43 | F 127 |
| 32&80 | → | 32 | C 44 | F 128 |
| 33&81 | → | 33 | C 45 | F 129 |
| 34&82 | → | 34 | C 46 | F 130 |
| 35&83 | → | 35 | C 47 | F 131 |
| 36&84 | → | 36 | C 48 | F 132 |
| 85&133 | ← | 1 | D 121 | A 37 |
| 86&134 | ← | 2 | D 122 | A 38 |
| 87&135 | ← | 3 | D 123 | A 39 |
| 88&136 | ← | 4 | D 124 | A 40 |
| 89&137 | ← | 5 | D 125 | A 41 |
| 90&138 | ← | 6 | D 126 | A 42 |
| 91&139 | ← | 7 | D 127 | A 43 |
| 92&140 | ← | 8 | D 128 | A 44 |
| 93&141 | ← | 9 | D 129 | A 45 |
| 94&142 | ← | 10 | D 130 | A 46 |
| 95&143 | ← | 11 | D 131 | A 47 |
| 96&144 | ← | 12 | D 132 | A 48 |
| 97&145 | ← | 13 | E 121 | B 37 |
| 98&146 | ← | 14 | E 122 | B 38 |
| 99&147 | ← | 15 | E 123 | B 39 |
| 100&148 | ← | 16 | E 124 | B 40 |
| 101&149 | ← | 17 | E 125 | B 41 |
| 102&150 | ← | 18 | E 126 | B 42 |
| 103&151 | ← | 19 | E 127 | B 43 |
| 104&152 | ← | 20 | E 128 | B 44 |
| 105&153 | ← | 21 | D 129 | B 45 |
| 106&154 | ← | 22 | D 130 | B 46 |
| 107&155 | ← | 23 | E 131 | B 47 |
| 108&156 | ← | 24 | E 132 | B 48 |
| 109&157 | ← | 25 | F 121 | C 37 |
| 110&158 | ← | 26 | F 122 | C 38 |
| 111&159 | ← | 27 | F 123 | C 39 |
| 112&160 | ← | 28 | F 124 | C 40 |
| 113&161 | ← | 29 | F 125 | C 41 |
| 114&162 | ← | 30 | F 126 | C 42 |
| 115&163 | ← | 31 | F 127 | C 43 |
| 116&164 | ← | 32 | F 128 | C 44 |
| 117&165 | ← | 33 | F 129 | C 45 |
| 118&166 | ← | 34 | F 130 | C 46 |
| 119&167 | ← | 35 | F 131 | C 47 |
| 120&168 | ← | 36 | F 132 | C 48 |

The servo gaps on the second gap line have been labeled A, B and C and the servo gaps on the first gap line have been labeled D, E and F for the chart labeled "Track Recording Sequence." This chart fully describes the writing of the tracks depending upon the direction of travel of the tape and which servo is controlling as well as which servo is the back up auxiliary servo. Assuming that servo gap A in the second gap line of the top zone is reading when the magnetic tape is moving to the right in FIG. 4, the top and bottom write elements in the top zone will write data tracks. When servo element A is reading servo track 37, the top write element will write track 1 and the bottom write element will write track 49. When the magnetic tape has reached the end of its travel in that direction, it will reverse direction and travel to the left in FIG. 4, causing the bottom zone to become controlling. At this time the servo element D reads servo track 121 and the top and bottom write elements on the second gap line will write data tracks 85 and 133 respectively. When the magnetic tape reaches the end of travel in this direction, it again reverses direction and travels to the left in FIG. 4 at which time servo element A in the second gap line will read servo track 38 causing the write elements on the first gap line to write data tracks 2 and 50. This operation continues until servo element A in the first gap line and servo element D in the first gap line have sequenced all the way through the 12 servo tracks in the top and bottom bands of FIG. 3, at which time the middle servo elements B and E become operational to write another set of 12 tracks in each of the top and bottom track locations in the top and bottom bands of FIG. 3. During all of these operations, when a servo element is serving a primary servo element in one zone, the servo element which is a mirror image of the primary servo element is operating as a back up auxiliary servo element in the other zone.

Figure 5:
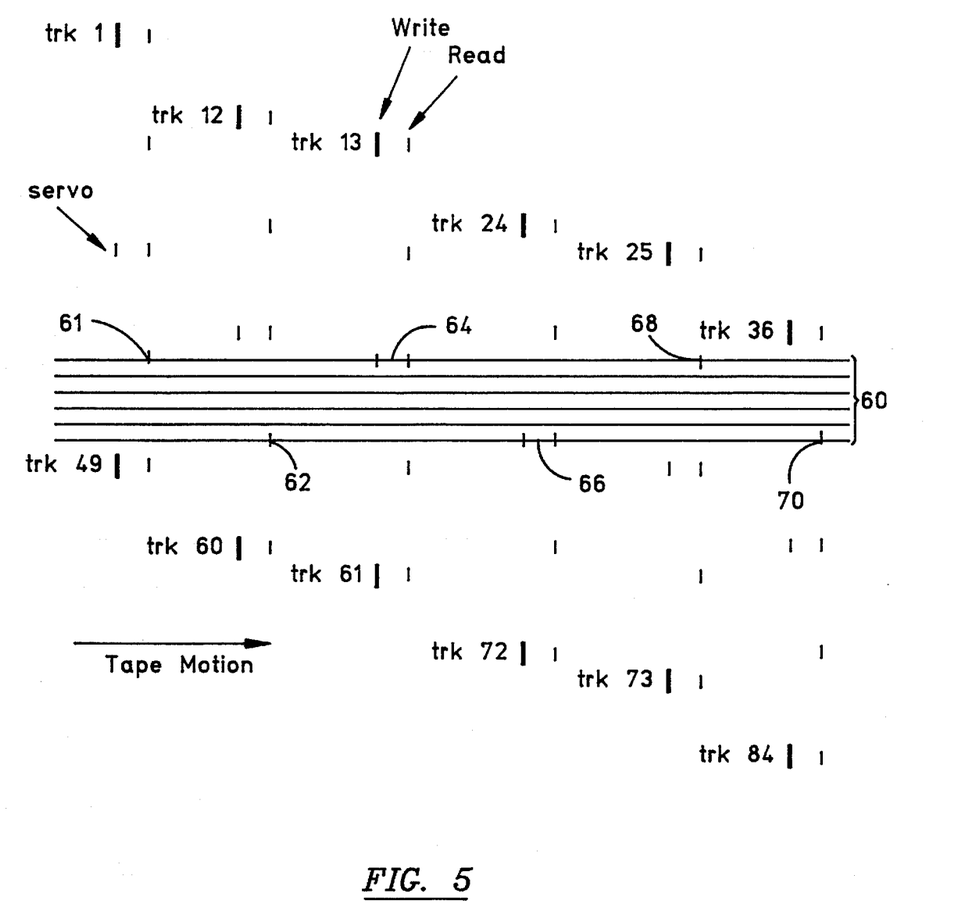
FIG. 5 is a schematic illustration of the tracks written when the servo gaps are in various positions relative to the servo lines of the embodiment shown in FIG. 4.

Another illustration of the operation of the magnetic head assembly 40 of FIG. 4 is illustrated in FIG. 5. This is a representation of just the top zone of the head surface of FIG. 4 with respect to traces of the locations of the 12 servo tracks on a tape. The 12 servo tracks are shown at 60. The write/read pairs are shown adjacent to track numbers and are located above and below the servo tracks 60. When the bottom servo element A of FIG. 4 sequences through all 12 of the servo tracks 60 from a top servo track position 61 to a bottom servo track position 62, shown in FIG. 5, the top write element on the first gap line will write tracks 1 through 12 and the bottom write element on the first gap line will write tracks 49 through 60. When the middle servo element B transitions from a top servo track position 64 to a bottom servo track position 66, the top write element will write tracks 13 through 24 and the bottom write element will write track 61 through 72. When the bottom servo element C transitions from a top servo position 68 to a bottom servo position 70, the top write element will write 25 through 36 and the bottom write element will write tracks 73 through 84. It is important to observe in this sequence that the operation of the servo elements does not interfere with the operation of the write elements nor does the operation of the write elements interfere with the operation of the servo elements. The servo elements are dedicated to their function of servoing on the servo tracks 60 which are remotely located from the top and bottom data tracks. This same function takes place with regard to the bottom zone shown in FIG. 4, however, it should be kept in mind that after tracks 1 and 49 are written by elements in the top zone that the direction of the travel of the magnetic tape is reversed so that the bottom zone can write tracks 85 and 133. This will alternate back and forth until all 168 tracks have been written.

If desired, the head surface of the head assembly 40 in FIG. 4 may be provided with a middle zone for accommodating additional magnetic elements. An exemplary arrangement is top and bottom write/read element pairs which are a mirror image with respect to one another so that the tape can be processed in both direction. The read gaps are shown with a track width of 76 µm which is about twice the track pitch and the write elements are shown with a track width of 177 µm which is about five times the track pitch. These particular dimensions are useful for writing and reading a prior art magnetic tape which has a wider track pitch. When the middle zone is employed to write or read the prior art tape, the top and bottom zones are inoperative.

It should be noted that since the top band of the tape, shown in FIG. 3, is written all in one direction and the bottom band is written all in an opposite direction, that the aforementioned problem of double track squeeze is eliminated. Since all of the data tracks are written in the same direction in each of the bands, the inherent signature of lateral movement of the tape due to the characteristics of the particular tape drive are matched from data track edge to data track edge rather than opposed which would occur if adjacent data tracks were written in opposite directions. Further, since the servo elements are totally dedicated to servoing and are not dependent upon the employment of read elements, the track width of the read elements can be made narrower, as illustrated in FIG. 4. This allows the write elements to be narrower in track width which results in a narrower track pitch for the layout of the magnetic tape shown in FIG. 3.

It should be noted from FIG. 4 that the write gaps have ample space along their respective gap lines. Heretofore, the write gaps were crowded and their flux producing coils had to be double-decked or triple-decked because of size constraints. This type of construction is obviated by the present invention since the write elements can now be constructed with a single layer flux inducing coil. Construction costs of the head assembly are also reduced by employing two modules instead of three modules. As stated hereinabove, each gap line represents a module which is joined together during fabrication. Additional modules are more costly and can develop more problems involving TMR. Also, because of the head element layout between the top and bottom zones, shown in FIG. 4, the stroke of the head assembly 40 can be lessened about 0.3 millimeters. This enables more elements to be constructed along a gap line, thereby reducing construction costs.

Figure 6:
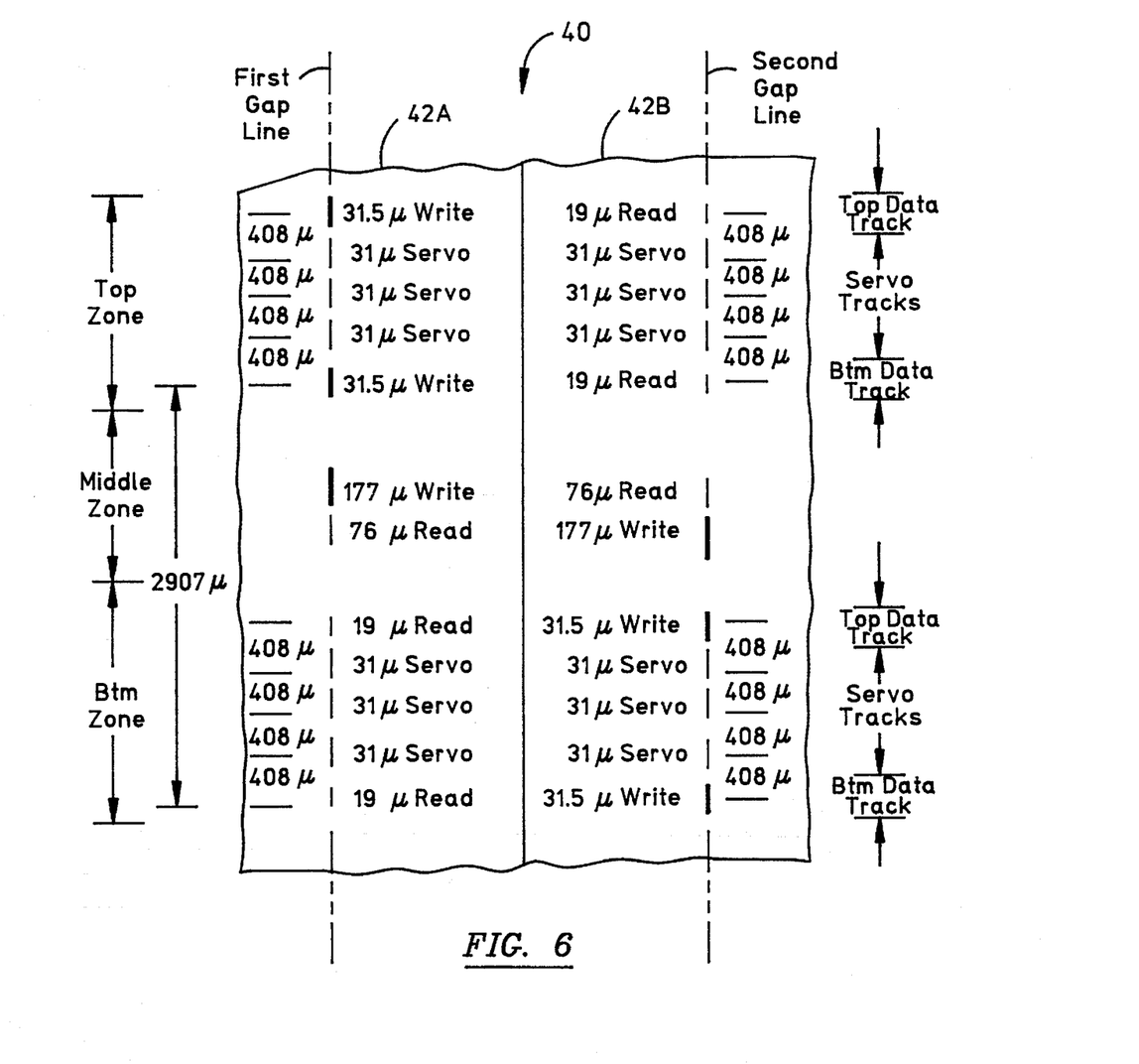
FIG. 6 is a schematic illustration of magnetic gaps on the head surface of another embodiment of the present invention.

FIG. 6 illustrates a second embodiment of the head assembly 40 which is a variant of the head assembly illustrated in FIG. 4. The only modification is that a pair of servo elements are mounted in each of the top and bottom data tracks in each of the top and bottom zones. The purpose of this modification is to provide additional flexibility for the servoing function. Any pair of servo elements on any data track can be employed to provide initialization of the tape drive to overcome TMR as discussed hereinabove. A pair of servo elements in the top zone can serve as primary servo elements, while a bottom pair of servo elements in the bottom zone can serve as back up servo elements. A pair of servo elements on the same track is more likely to continue a servoing operation when a longitudinal scratch or defect is encountered on the servo track since it is unlikely that the scratch or defect will bridge between both of the servo elements. Should such a scratch or defect be encountered, however, the bottom pair of servo elements, which is serving as backup, would then take control to continue the servoing function. Providing interference is not a problem between servo elements and write elements in the same gap line, the servo elements can provide a more accurate servoing for the write elements since any problem of TMR between modules becomes of no consequence. The same holds true for the bottom zone shown in FIG. 6. However, because of the potential for interference between the servo elements and the write elements and the cost of additional servo elements for the second embodiment shown in FIG. 6, the embodiment shown in FIG. 4 is preferred.

Figure 7:
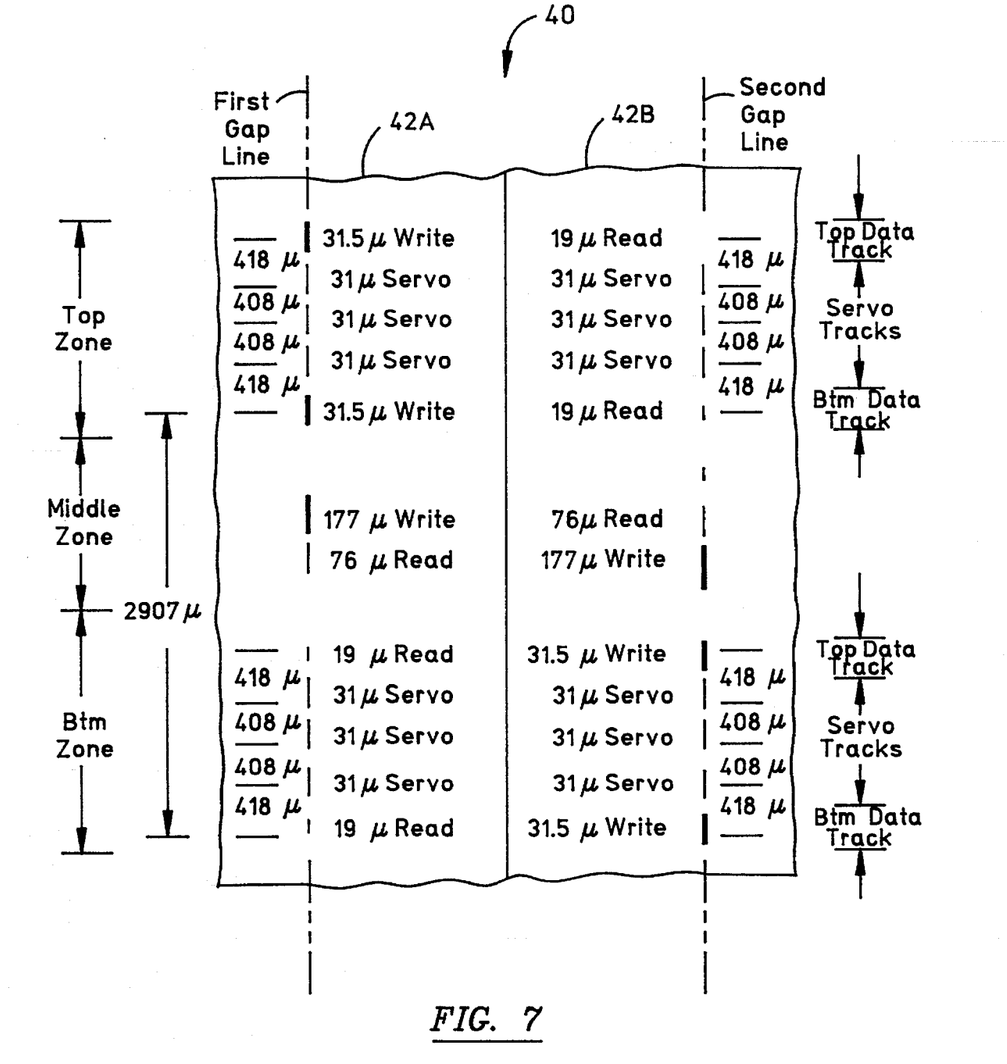
FIG. 7 is similar to FIG. 6 except additional track width is provided between write gaps and pre-recorded servo tracks to minimize servo track erasure.

In order to minimize interference problems associated with the embodiment shown in FIG. 6 guard bands can be provided as shown by the third embodiment in FIG. 7. In FIG. 7, the top and bottom write/read gap pairs in both of the top and bottom zones are spaced an additional 10 µm from the servo gaps. This can be accomplished simply by reducing the center guard band 44 in FIG. 3 from 51 µm to 11 µm. These guard bands will prevent the write gaps from overwriting servo tracks 37, 48, 121 and 132 because of the additional space provided between the write gaps and these servo tracks. It should be noted that the present invention allows a change of guard bands without significantly altering the layout of the head gaps on the head surface.

Figure 8:
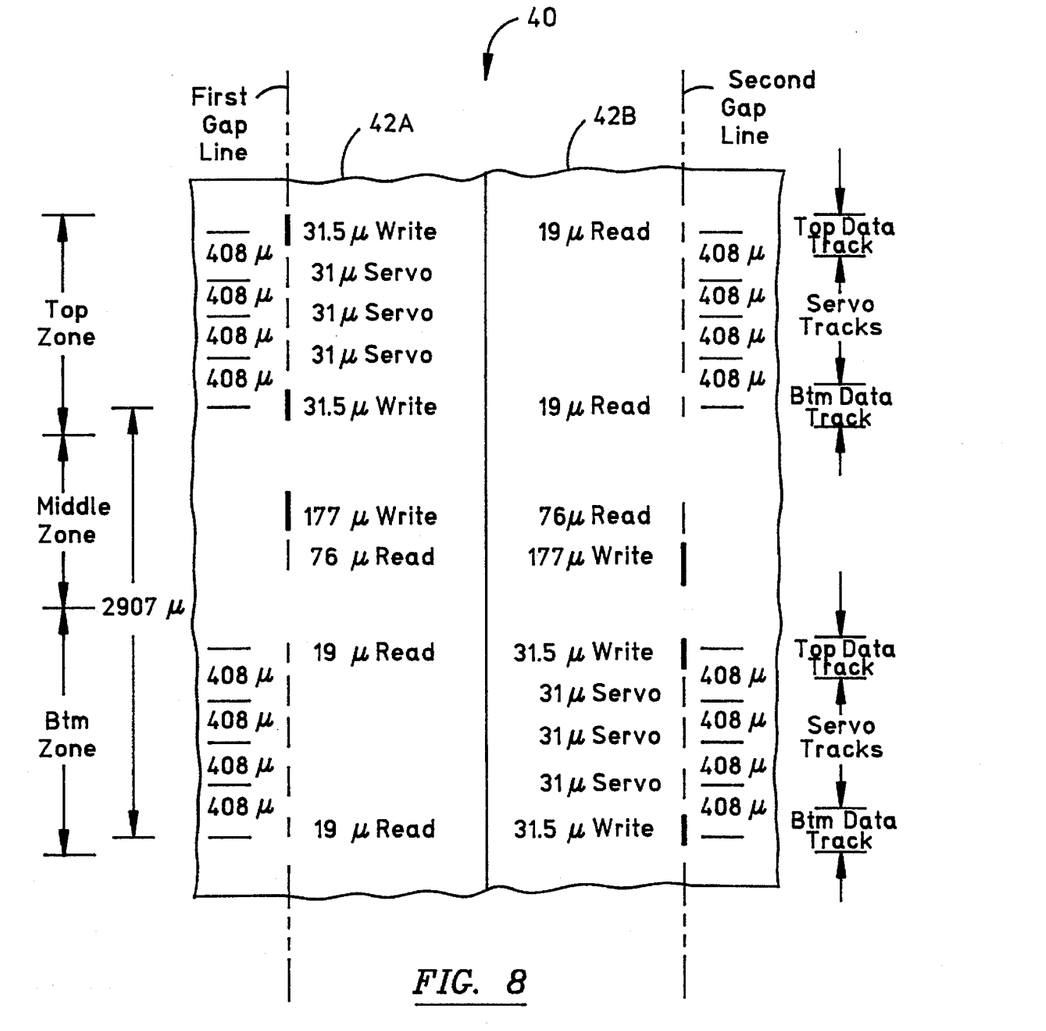
FIG. 8 is an arrangement of magnetic gaps on the head surface of still another embodiment of the head assembly.

In FIG. 8, a still further modification of the embodiment of FIG. 6 is shown. In this embodiment, the servo gaps in the second gap line of the top zone are eliminated and the servo gaps in the first gap line of the bottom zone are eliminated. The advantage of this head assembly would be that the servo gaps in the first gap line serve the write elements in the first gap line and the servo elements in the second gap line serve the write gaps in the second gap line. Accordingly, there would be no problem of TMR between the first and second gap lines caused during fabrication of the head assembly. The disadvantages are that there may be interference between the servo elements and the write elements and there is no provision for initially compensating for TMR with a pair of servo elements on the same track.

With the above arrangement the track width of the read gaps can be at least 25 percent less than the track width of the servo gaps. In all embodiments, the servoing function and the reading function are decoupled by separate elements to perform these functions. Servo elements are dedicated for servoing and read elements are dedicated for reading. This provides many advantages as mentioned hereinabove.

Clearly, other embodiments and modifications of this invention will occur readily to those ordinarily skilled in the art of these teachings. Therefore, this invention is to be limited only by the following claims, which include all of such embodiments and modifications when viewed in conjunction with the above specification and accompanying drawing.

We claim:

1. A head assembly which has a plurality of write elements, magnetoresistive read elements and magnetoresistive servo elements, each element having a respective gap which has a track width which is located at a head surface of the head assembly, the head assembly comprising:

the head surface having top and bottom zones, each of the top and bottom zones having a length and a lateral width;

each of the top and bottom zones including:
only first and second longitudinally spaced gap lines which extend laterally along a width of the respective zone;
the track widths of the gaps extending along the gap lines;
first and second data lines and servo lines laterally spaced from one another and capable of corresponding with tracks on a magnetic tape, the servo line being located between the first and second data lines;

the track widths of the gaps extending perpendicular to the data lines;

a first set of a write gap and a read gap located along first one of the data lines and a second set of a write gap and a read gap located along a second one of the data lines, the write gap of each of the first and second sets being located on one of the gap lines and the read gap of each of the first and second sets being located on the other gap line; and at least one servo gap located on each of the servo lines; and the write gaps, the read gaps and the servo gaps of the first and second zones being a mirror image with respect to one another.

2. A magnetic tape drive including the head assembly of claim 1, the drive comprising:

a housing;

means mounted in the housing for moving a magnetic tape;

movable support means mounted in the housing for supporting the head assembly in a transducing relationship with the magnetic tape at various track locations along its width;

track control means connected to the head assembly for receiving signals from the servo elements for moving the head assembly via the support means to various tracks on the magnetic tape; and data control means connected to the head assembly for transmitting write signals to and receiving read signals from the head assembly.

3. A head assembly as claimed in claim 1 wherein each of the first and second zones includes:

only one servo gap being located on the first gap line;

an odd number of servo gaps greater than one being located on the second gap line; and a middle servo gap of said odd number of servo gaps being located on a common servo line with said only one servo gap which is located on the first gap line.

4. A head assembly as claimed in claim 1 wherein each of the first and second zones includes:

at least three servo lines located between the first and second data lines.

5. A head assembly as claimed in claim 3 wherein:

the first zone includes all write gaps being located on the first gap line and all read gaps being located on the second gap line and the second zone includes all write gaps being located on the second gap line and all read gaps being located on the first gap line.

6. A head assembly as claimed in claim 1 wherein each of the first and second zones includes:

all of the write gaps being located on the first gap line and all of the read gaps being located on the second gap line.

7. A head assembly as claimed in claim 1 wherein each of the first and second zones includes:

all of the lines having an equal track width: and a pitch of the servo gaps being an integer multiple of said track width of the lines; and a pitch of the write gaps and a pitch of the read gaps each being the number of servo gaps plus one times the pitch of the servo gaps.

8. A head assembly as claimed in claim 7 wherein each of the first and second zones includes:

said track width of the lines being substantially 34 μm; and said integer multiple of said track width of the tracks for the pitch of the servo elements being 12.

9. A head assembly as claimed in claim 1 including:

the head surface of the head assembly having a third zone located between the first and second zones, the third zone having a length and a lateral width;

the third zone having a plurality of data lines which extend along a length of the third zone: and a set of a write gap and a read gap located in each data line of the third zone.

10. A head assembly as claimed in claim 9 wherein each of the first and second zones of the ABS includes:

each of the write gaps in each set of a write gap and a read gap in the third zone having a track width which is greater than said equal track width of the lines.

11. A head assembly as claimed in claim 1 wherein each of the first and second zones includes:

all of the write gaps having an equal track width, all of the read gaps having an equal track width and all of the servo gaps having an equal track width; and the track width of the read gaps being at least 25% less in width than the track width of the servo gaps.

12. A head assembly as claimed in claim 1 including:

the first gap line of each of the first and second zones being aligned with respect to one another and the second gap line of each of the first and second zones being aligned with respect to one another.

13. A head assembly as claimed in claim 12 wherein each of the first and second zones includes:

only one servo gap being located on the first gap line;

an odd number of servo gaps greater than one being aligned on the second gap line;

a middle servo gap of said odd number of servo gaps being located on a common servo line with said only one servo gap which is aligned on the first gap line.

14. A head assembly as claimed in claim 13 wherein each of the first and second zones includes:

all of the write gaps being aligned on the first gap line and all of the read gaps being aligned on the second gap line.

15. A head assembly as claimed in claim 14 wherein each of the first and second zones includes:

each data and servo line having a track width of substantially 34 μm;

a pitch of the servo gaps of said odd number of servo gaps which are aligned on said second gap line each being 12 times said track width of the lines; and a pitch of the write gaps on said first gap line and a pitch of the read gaps on said second gap line being an integer multiple of the pitch of the servo elements wherein said multiple equals the number of servo gaps on the second gap line plus one.

16. A head assembly as claimed in claim 15 including:

the head surface of the head assembly having a third zone between the first and second zones, the third zone having a length and a lateral width;

the third zone having a plurality of data lines which extend along a length of the third zone:

a set of a write gap and a read gap located in each data line of the third zone; and each of the write gaps in each set of a write gap and a read gap in the third zone having a track width which is greater than said track width of the lines.

17. A head assembly as claimed in claim 16 wherein each of the first and second zones includes:

all of the write gaps having an equal track width, all of the read gaps having an equal track width and all of the servo gaps having an equal track width: and the track width of the read gaps being at least 25% less than the track width of the servo gaps.

18. A magnetic tape drive including the head assembly of claim 17, the drive comprising:

a housing;

means mounted in the housing for moving a magnetic tape;

movable support means mounted in the housing for supporting the head assembly in a transducing relationship with the magnetic tape at various track along its width;

track control means connected to the head assembly for receiving signals from the servo elements for moving the head assembly via the support means to various tracks and various azimuthal orientations with respect to the magnetic tape; and data control means connected to the head assembly for transmitting write signals to and receiving read signals from the head assembly.

19. A head assembly as claimed in claim 12 wherein each of the first and second zones includes:

only three servo lines located between the first and second data lines; and a pair of servo gaps located in each of the servo lines.

20. A head assembly as claimed in claim 19 wherein each of the first and second zones includes:

each data and servo track having a track width of substantially 34 μm;

a pitch of the servo gaps of said odd number of servo gaps which are located on said second gap line being 12 times said track width of the lines; and a pitch of the write gaps on said first gap line and a pitch of the read gaps on said second gap line each being an integer multiple of the pitch of the servo gaps.

21. A head assembly as claimed in claim 20 including:

the head surface of the head assembly having a third zone between the top and bottom zones, the third zone having a length and a lateral width;

the third zone having a plurality of data lines which extend along a length of the third zone;

a set of a write gap and a read gap located in each data line of the third zone; and each of the write gaps in each set of a write gap and a read gap in the third zone having a track width which is greater than said track width of the lines.

22. A head assembly as claimed in claim 21 wherein each of the first and second zones includes:

all of the write gaps having an equal track width, all of the read gaps having an equal track width and all of the servo gaps having an equal track width; and the track width of the read being at least 25% less than the track width of the servo gaps.

23. A magnetic tape drive including the head assembly of claim 22, the drive comprising:

a housing;

means mounted in the housing for moving a magnetic tape;

movable support means mounted in the housing for supporting the head assembly in a transducing relationship with the magnetic tape at various track locations along its width;

track control means connected to the head assembly for receiving signals from the servo elements for moving the head assembly via the support means to various tracks and various azimuthal orientations with respect to the magnetic tape; and data control means connected to the head assembly for transmitting write signals to and receiving read signals from the head assembly.

24. A head assembly as claimed in claim 12 wherein:

the first zone includes all write gaps being located on the first gap line and all read gaps being located on the second gap line and the second zone includes all write gaps being located on the second gap line and all read gaps being located on the first gap line.

25. A head assembly as claimed in claim 24 wherein each of the first and second zones includes:

each data and servo line having a track width of substantially 34 μm;

a pitch of the servo gaps of said odd number of servo gaps which are aligned on said second gap line being 12 times said track width of the lines: and a pitch of the write gaps on said first gap line and a pitch of the read gaps on said second gap line being an integer multiple of the pitch of the servo gaps.

26. A head assembly as claimed in claim 25 including:

the head surface of the head assembly having a third zone between the first and second zones, the third zone having a length and a lateral width;

the third zone having a plurality of data lines which extend along a length of the third zone:

a set of a write gap and a read gap located in each data line of the third zone: and each of the write gaps in each set of a write gap and a read gap in the third zone having a track width which is greater than said track width of the lines.

27. A head assembly as claimed in claim 26 wherein each of the first and second zones includes:

all of the write gaps having an equal track width, all of the read gaps having an equal track width and all of the servo gaps having an equal track width; and the track width of the read gaps being at least 25% less than the track width of the servo gaps.

28. A magnetic tape drive including the head assembly of claim 27, the drive comprising:

a housing;

means mounted in the housing for moving a magnetic tape;

movable support means mounted in the housing for supporting the head assembly in a transducing relationship with the magnetic tape at various track locations along its width;

track control means connected to the head assembly for receiving signals from the servo elements for moving the head assembly via the support means to various tracks and various azimuthal orientations with respect to the magnetic tape; and data control means connected to the head assembly for transmitting write signals to and receiving read signals from the head assembly.

* * * * *

UNITED STATES PATENT AND TRADEMARK OFFICE
CERTIFICATE OF CORRECTION

PATENT NO. : 5,488,525
DATED : January 30, 1996
INVENTOR(S) : Adams et al

It is certified that error appears in the above-indentified patent and that said Letters Patent is hereby corrected as shown below:

```
Column 1, line 52, delete "gaps" and insert --gap--.
          line 53, delete "lines" and insert --line--.

Column 6, line 29, delete "line" and insert --track--.
          line 30, delete "track" and insert --line--.

Column 13, line 3, insert --a-- after "along".

Column 15, line 13, delete "track" and insert --tracks--.
```

Signed and Sealed this

Eighteenth Day of June, 1996

Attest:

BRUCE LEHMAN

*Attesting Officer*  *Commissioner of Patents and Trademarks*